US007679726B2

(12) United States Patent
Yamaguchi

(10) Patent No.: US 7,679,726 B2
(45) Date of Patent: Mar. 16, 2010

(54) RADAR FOR USE IN VEHICLE

(75) Inventor: Kazuhiko Yamaguchi, Gifu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 0 days.

(21) Appl. No.: 11/334,480

(22) Filed: Jan. 19, 2006

(65) Prior Publication Data

US 2006/0262290 A1 Nov. 23, 2006

(30) Foreign Application Priority Data

Feb. 21, 2005 (JP) ............................. 2005-043380

(51) Int. Cl.
*G01C 3/08* (2006.01)
(52) U.S. Cl. .................. 356/4.01; 356/4.1; 356/5.01; 356/5.1
(58) Field of Classification Search ......... 356/4.01–4.1, 356/3.01–3.15, 5.01–5.15, 6–22, 28, 28.5
See application file for complete search history.

(56) References Cited

U.S. PATENT DOCUMENTS

| | | | | |
|---|---|---|---|---|
| 4,277,170 | A * | 7/1981 | Miles | 356/141.3 |
| 5,933,225 | A | 8/1999 | Yamabuchi | |
| 5,973,770 | A * | 10/1999 | Carter et al. | 356/4.09 |
| 6,611,318 | B2 * | 8/2003 | LaPolice | 356/3.03 |
| 7,158,231 | B1 * | 1/2007 | Woollam et al. | 356/369 |

| | | | |
|---|---|---|---|
| 2003/0133095 | A1 * | 7/2003 | Solgaard et al. ............... 356/18 |
| 2004/0169840 | A1 * | 9/2004 | Hoashi et al. ............... 356/4.01 |
| 2005/0225744 | A1 * | 10/2005 | Samukawa et al. ........... 356/28 |

FOREIGN PATENT DOCUMENTS

| | | |
|---|---|---|
| JP | 1-164518 | 11/1989 |
| JP | 05-52938 | 3/1993 |
| JP | 50-52938 | 3/1993 |
| JP | 7-114122 | 5/1995 |
| JP | 10-153653 | 6/1998 |
| JP | 11-044750 | 2/1999 |
| JP | 11-64518 | 3/1999 |
| JP | 11-166974 | 6/1999 |

OTHER PUBLICATIONS

Japanese Office Action dated Jun. 16, 2009, issued in corresponding Japanese Application No. 2005-043380, with English translation.

* cited by examiner

*Primary Examiner*—Thomas H Tarcza
*Assistant Examiner*—Luke D Ratcliffe
(74) *Attorney, Agent, or Firm*—Nixon & Vanderhye PC

(57) ABSTRACT

A radar system for use in a vehicle includes a transmission function for transmitting a transmission wave at a predetermined interval, a redirection function having a plurality of redirection planes for redirecting the transmission wave at least twice in a successive manner in a same direction, a reception function for outputting a reception signal based on a reception of a reflected wave that corresponds to the transmission wave, and an integration function for outputting an integration signal upon integrating a plurality of the reception signals that correspond to the transmission waves redirected in the same direction.

22 Claims, 7 Drawing Sheets

$R \cdot \sin \theta n = \sin \varepsilon n$

RADAR FOR USE IN VEHICLE

CROSS REFERENCE TO RELATED APPLICATION

This application is based on and claims the benefit of priority of Japanese Patent Application No. 2005-43380 filed on Feb. 21, 2005, the disclosure of which is incorporated herein by reference.

FIELD OF THE INVENTION

The present invention generally relates to a laser radar for detecting an object.

BACKGROUND OF THE INVENTION

Conventionally, a radar system in a vehicle detects preceding vehicle by transmitting a laser beam or the like. The transmitted laser beam is reflected from a reflective surface on the preceding vehicle, and is returned to be captured by the radar system. In this manner, the radar system can detect the preceding vehicle at a distance of more than 100 meters. However, the signal noise ratio (S/N ratio) of the laser beam reflected from the reflective surface decreases when the reflection from the preceding vehicle is deteriorated. That is, a signal factor in the reflected laser beam from the preceding vehicle and a noise factor in the reflected laser beam from other objects are indistinguishable. As a result, a detection range of the radar system decreases Various methods for increasing the S/N ratio of the signal used in the radar system have been proposed. That is, for example, a radar system having a signal integration function for an improvement of the S/N ratio of the signal from a detected object is disclosed in Japanese patent document JP-A-2004-177350. The radar system in this disclosure uses a polygon mirror that rotates at a constant speed for reflectively transmitting a transmitted wave. Each of the transmitted waves transmitted in a different direction scans a predetermined range of angles for detecting an object. The radar system integrates the signals reflected from the detected object for an improvement of the S/N ratio.

However, a problem is experienced in the radar system disclosed in Japanese patent document JP-A-2004-177350 because the transmitted wave cannot be directed in the same direction more than once due to the use of the rotating mirror having a constant rotation speed. That is, for example, the transmitted wave cannot be projected toward the same part of the preceding vehicle plural times within a predetermined interval. Further, the transmitted wave in a horizontal direction is scattered over an angle that is much greater than a required range for object detection because of the mechanical characteristics of the rotating polygon mirror. Therefore, the radar system has to cancel transmission of the transmitted waves toward unnecessary angle ranges. As a result, time for transmission of the transmitted waves for unnecessary angle ranges is wasted. In other words, reduction of wasted time is desirable for improvement of S/N ratio.

SUMMARY OF THE INVENTION

In view of the above-described and other problems, the present invention provides a radar system having an improved S/N ratio for both of a transmitted wave and a received wave.

The radar system for a vehicular use in the present invention is characterized by a transmission unit for transmitting a transmission wave at a predetermined interval, a redirection unit having a plurality of redirection planes for redirecting the transmission wave at least twice in a successive manner in a same direction, a reception unit for outputting a reception signal based on a reception of a reflected wave that corresponds to the transmission wave, and an integration unit for outputting an integration signal upon integrating a plurality of the reception signals that correspond to the transmission waves redirected in the same direction.

The redirection unit may be combined with a drive unit that for a movement of the redirection unit relative to the transmission unit.

Further, the redirection unit may include a plurality of prisms having the redirection plane, and the respective prism has a different refraction angle. The prisms may be substituted by mirrors.

Furthermore, the redirection unit may be a disc that is formed by a circular arrangement of the plurality of redirection planes. The redirection unit may be a board that is formed by a linear arrangement of the plurality of redirection planes.

Furthermore, the plurality of the redirection planes in the redirection unit may have respectively different refractive indexes. In this manner, the radar system can detect an object in a three-dimensional space.

Furthermore, the plurality of the redirection planes may have respectively different sizes. In this manner, the radar system can send an increased number of transmission waves in a specific direction, thereby having an improved S/N ratio of reception signals for the specific direction of importance such as a front space of a vehicle or the like.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

A first embodiment and a second embodiment of the present invention are described with reference to the drawings. The radar system of the present invention is intended for use in a subject vehicle such as an automobile or the like.

First Embodiment

The first embodiment of the present invention is described with reference to the drawings in FIGS. 1 to 6B.

Figure 1:
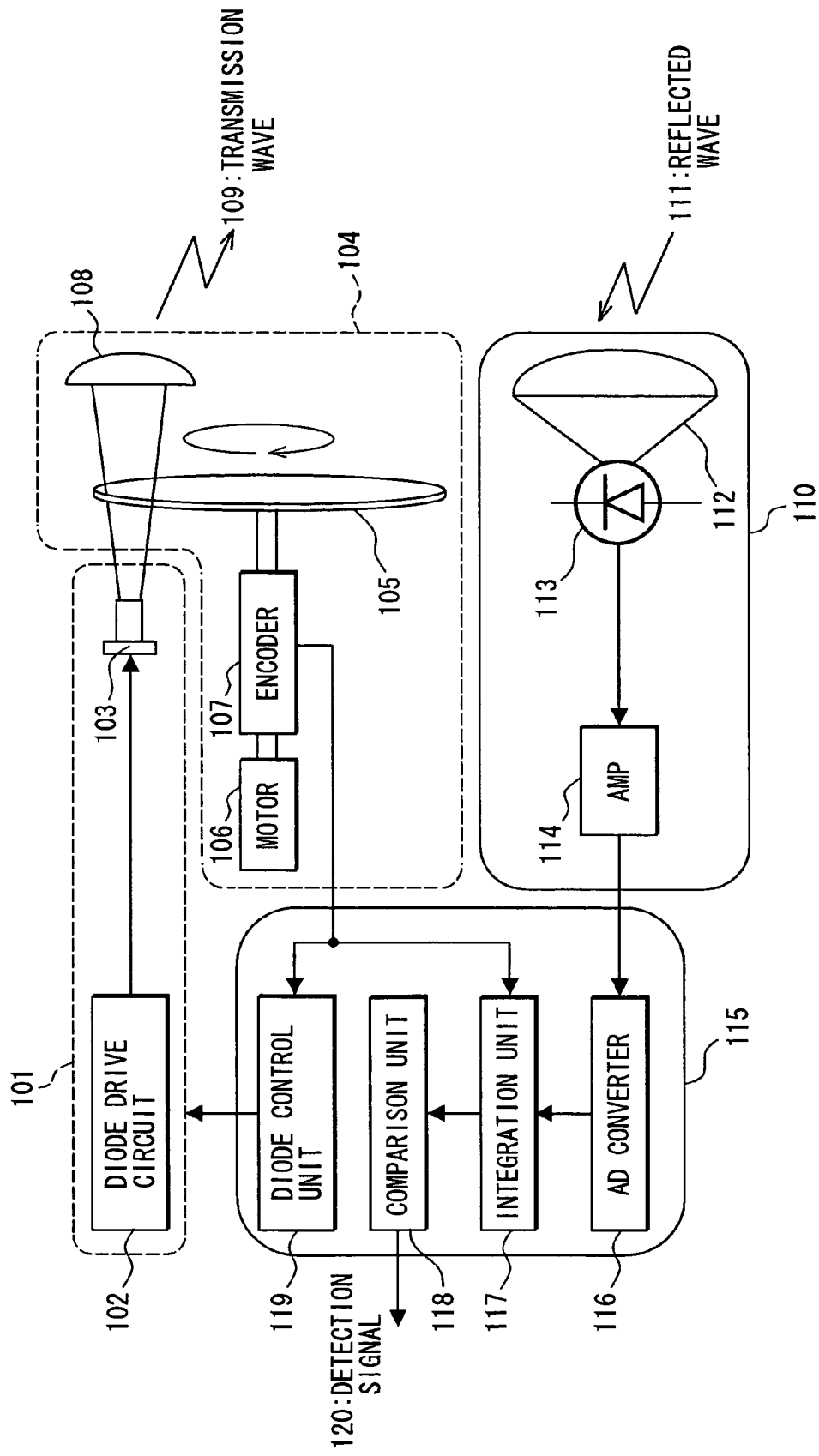
FIG. 1 shows a block diagram of a radar system in a first embodiment of the present invention.

FIG. 1 shows a block diagram of the radar system in a first embodiment of the present invention. The radar system includes four groups of components. That is, a transmission unit 101, a rotating refraction unit 104, a reception unit 110, and a calculation unit 115. These components are disposed in a front bumper in a front section of a vehicle. The transmission unit 101 includes a laser diode 103 and a diode drive circuit 102. The diode drive circuit 102 outputs an emission command to the laser diode 103 based on an output from the diode control unit 119 in the calculation unit 115. The laser diode 103 emits a laser beam at very short intervals when it receives an emission command from the diode drive circuit 102.

The rotating refraction unit 104 includes a refraction disc 105, a motor 106 for rotating the refraction disc 105, an encoder 107 for detecting a rotation angle of the refraction disc 105, and an emission lens 108. The radar system of the present invention is mainly used to detect a preceding vehicle by transmitting a transmission wave 109 horizontally toward a front space of a subject vehicle without scanning vertically.

The reception unit 110 includes a reception lens 112 for receiving a reflected wave 111 that comes from a detecting object as a reflection of the transmission wave 109 transmitted from the transmission unit 101, a photo diode 113 for converting reflected wave 111 to reception signal in an analog format, and an amplifier 114 for amplifying the reception signal outputted from the photo diode 113.

The calculation unit 115 includes an A/D converter 116 for converting the reception signal amplified by the amplifier 114 in the analog format to a digital format, an integration unit 117 for integrating information on the rotation angle of the refraction disc 105 derived from the encoder 107 and the reception signal in the digital format, a comparison unit 118 for outputting a detection signal 120 based on a integration signal outputted from the integration unit 117, and diode control unit 119 for outputting a circuit control command to the diode drive circuit 102 based on the information on the rotation angle of the refraction disc 105.

Figure 2:
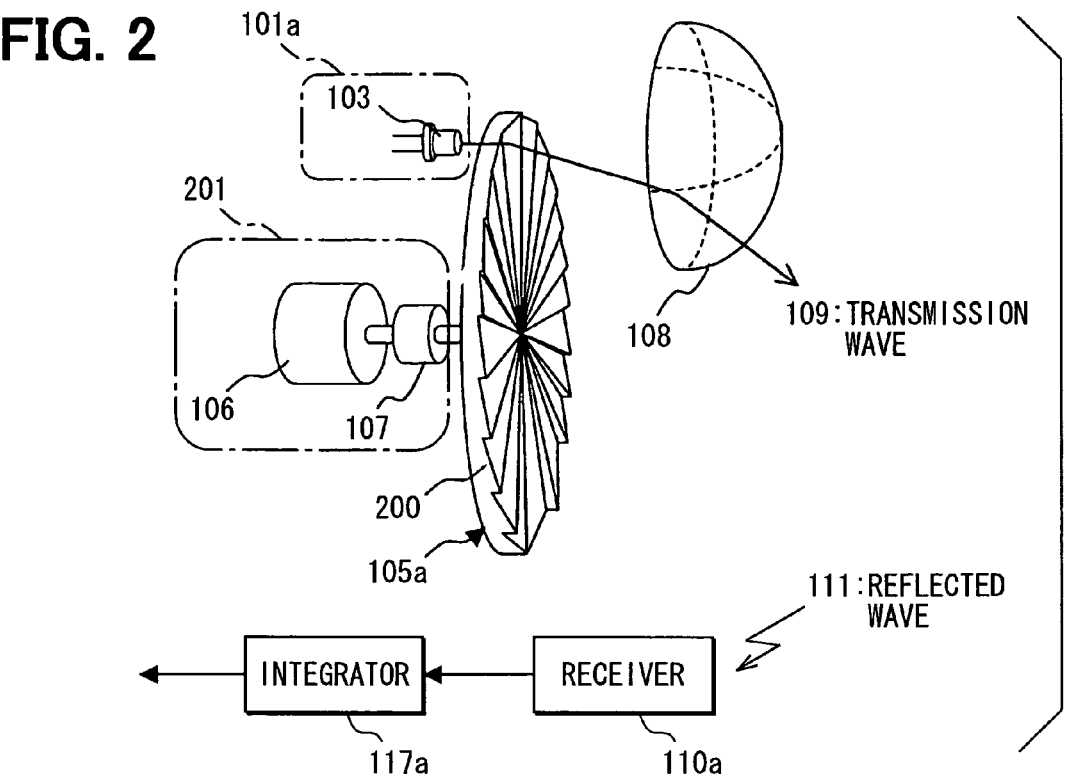
FIG. 2 shows an illustration of components in the radar system in the first embodiment.

FIG. 2 shows an illustration of components in the radar system in the first embodiment.

The refraction unit 105a corresponds to the refraction disc 105 in FIG. 1. The drive unit 201 corresponds to the motor 106 and the encoder 107. The refraction unit 105a in combination with the emission lens 108 and the drive unit 201 corresponds to the rotating refraction unit 104 in FIG. 1. The refraction unit 105a includes j pieces of prisms 200 in a fan shape, each of the fan shape having a same center angle of $360/j$ degree. A slant angle $\theta n$ (n=1 to j) described later is different for each prism 200. The refraction unit 105a has the motor 106 on its axis for rotating the refraction unit 105a at a constant speed. The encoder 107 is attached in a position between the motor 106 and the refraction disc 105 for detecting the rotation angle of the axis of the refraction disc 105 in real time. The laser diode 103 is disposed to emit the laser beam to be projected in parallel with the axis of the refraction unit 105a toward the refraction disc 105. The laser beam emitted from the laser diode 103 is refracted by the prism 200 in the refraction unit 105a, and is projected toward the detecting object as the transmission wave 109 after being formed as parallel light by the emission lens 108. The reflected wave 111 is received by a receiver 110a that corresponds to the reception unit 110 in FIG. 1, and is integrated by an integrator 117a as the reception signal. The integrator 117a corresponds to the integration unit 117 in FIG. 1.

Figure 3:
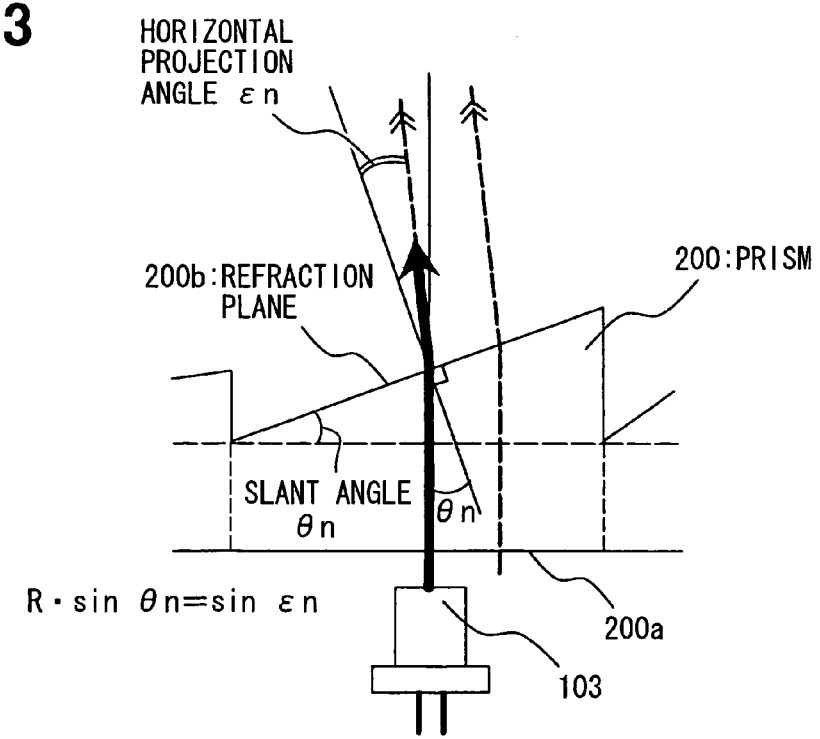
FIG. 3 shows an illustration of relationship between a horizontal projection angle and slant angle of refraction plane in the first embodiment.

FIG. 3 shows an illustration of relationship between a horizontal projection angle and slant angle of the refraction plane in the first embodiment.

A slant angle of a refraction plane 200b of the prism 200 is defined as the angle $\theta n$ between the refraction plane 200b and a prism base 200a. The laser beam is injected into the prism 200 from the prism base 200a and is projected from the refraction plane 200b. A horizontal projection angle $\epsilon n$ is defined as an angle between a perpendicular line of the refraction plane and an axis of the laser beam. A size of the prism base 200a is larger than a projection area of the laser beam emitted from the laser diode 103. Therefore, the rotation angle of the refraction disc 105 between time $Tn-1$ and $Tn$ is between $\alpha Tn-1$ and $\alpha Tn$. That is, the laser beam is projected through the n−1th prism 200. The horizontal projection angle $\epsilon n$ is constant during the time between $Tn-1$ and $Tn$ because the angle between the refraction plane 200b and the prism base 200a is constant regardless of an injection position of the laser beam in the prism base 200a. The horizontal projection angle $\epsilon n$ is set to increase by an angle of $\phi$ when the refraction disc 105 is rotated to bring the n+1th prism 200 in a path of the laser beam. That is, the slant angle $\theta n+1$ of the n+1th prism 200 is set so that the horizontal projection angle $\epsilon n+1$ becomes greater than the angle $\epsilon n$ by the angle of $\phi$.

Figure 4:
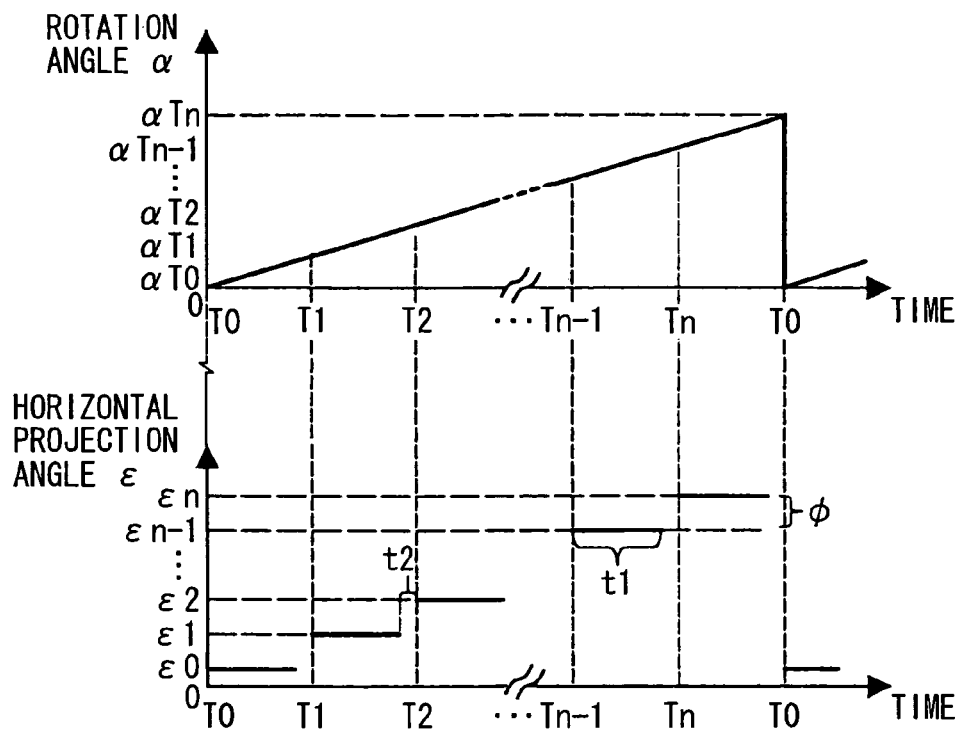
FIG. 4 shows a diagram of relationship between a rotation angle of a reflector and the horizontal projection angle in the first embodiment.

The relationship of the rotation angle of the refraction disc 105 and the horizontal projection angle is shown in FIG. 4.

Figure 5:
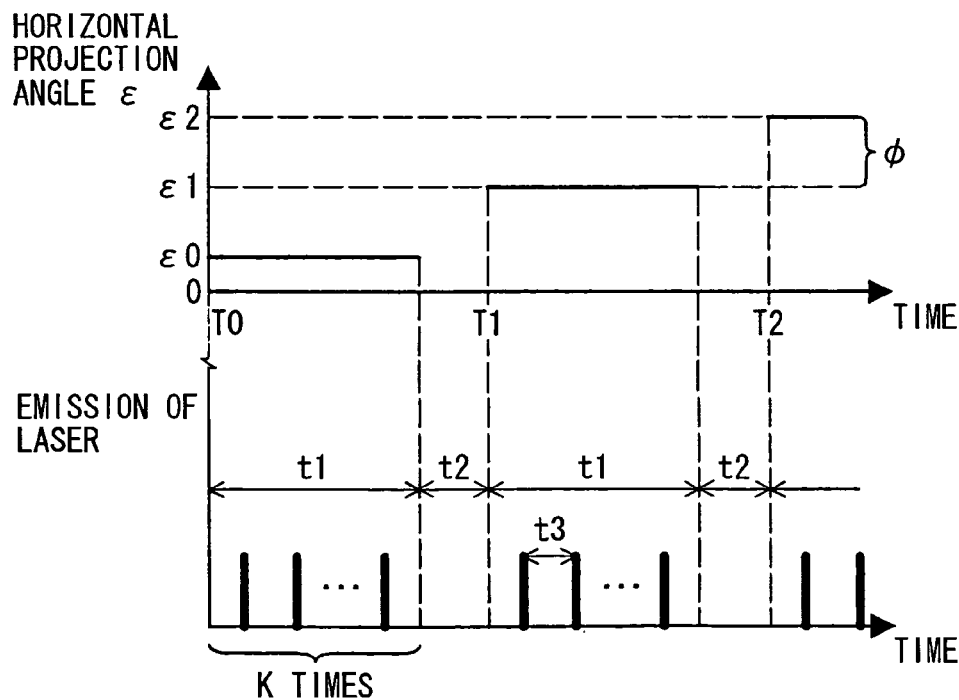
FIG. 5 shows a time chart of laser beam projection in combination with the horizontal projection angle in the first embodiment.

FIG. 5 shows a time chart of laser beam projection from the laser diode 103 relative to the horizontal projection angle $\epsilon n$ in the first embodiment. This time chart shows that the transmission wave 109 is repeatedly projected in a same direction for k times at a constant interval of t3 while the nth prism 200 passes the path of the laser beam emitted from the laser diode 103. The laser beams are projected in the same direction because the horizontal projection angle $\epsilon n$ is constant while the nth prism 200 is passing in front of the laser diode 103. In this case, the laser diode 103 emits the laser beam toward only one prism 200 for time t1, and the laser diode 103 emits the laser beam transitionally toward two adjacent prisms 200 for time t2. That is, the projection area of the laser beam includes a boundary of the nth prism 200 and the n+1th prism 200 for time t2.

The prism 200 is switched at an interval of (t1+t2) because the rotation of the refraction disc 105 is at a constant speed. The diode control unit 119 and the integration unit 117 determine whether the position of the laser diode 103 is under the boundary of the two prisms 200 based on the information of the rotation angle of the refraction disc 105 derived from the encoder 107.

Figure 6A:
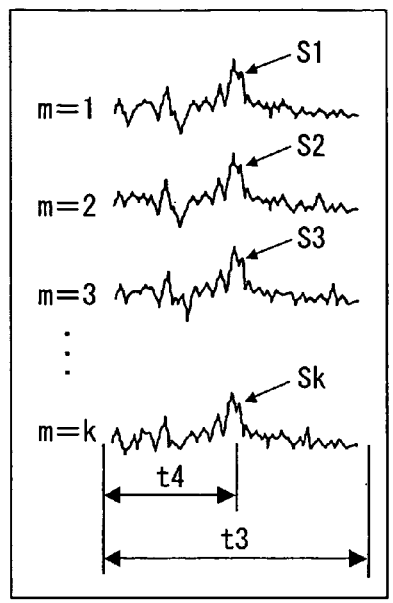
FIG. 6A shows a diagram of reception signals before an integration process for an improvement of an S/N ratio in the first embodiment.
Figure 6B:
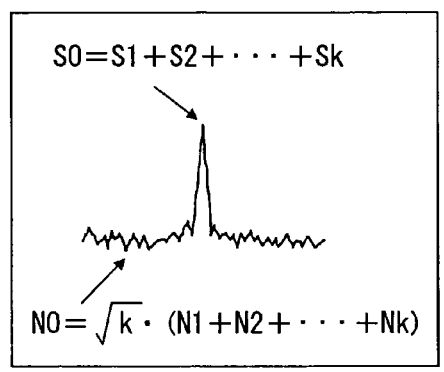
FIG. 6B shows a diagram of an integrated reception signal in the second embodiment.

FIGS. 6A and 6B are used to illustrate integration method in the integration unit 117. The integration unit 117 determines a switch timing of the prism 200 receiving the laser beam based on the circuit control command from the diode control unit 119 and the information on the rotation angle of the refraction disc 105, and integrates the reception signals of the laser beams refracted by the same prism 200 as shown in FIG. 6A. A signal factor Sm in the reception signal of the reflected wave 111 from a same object appears at a same time t4 from transmission of the transmission wave 109 in all of the k counts of the reception signals. Therefore, the integrated signal factor S0 in the integration signal is k time amplification of the signal factor Sm in the reception signal. On the other hand, an integrated noise factor N0 derived from integration of reception signals of k counts is only amplified by $\sqrt{k}$ times because of the randomness of the cause of the noise. In this manner, the integrated signal factor S0 can be easily distinguished from the integrated noise factor N0 in the integrated reception signal integrated by the integration unit 117 even when the signal factor Sm in each of the reception signal is weak to be distinguished from a noise factor Nm.

The comparison unit 118 is used to output a detection signal 120 after detecting a distance from the radar system to a detecting object based on time difference between a start time of the transmission of the laser beam upon switching the prisms 200 and an end time when the integrated signal factor of the reception signals exceeds a threshold.

The radar system of the present invention uses the transmission unit 101 disposed to emit the laser beam in parallel with the axis of rotation of the refraction disc 105 for eliminating wasted time caused by the refraction of the laser beam toward unnecessary directions owing to the use of the polygon mirror. Further, the S/N ratio of the reception signal is increased by transmitting the transmission waves 109 for plural times in the same direction to receive the reflected waves for integration of the signal factors.

Second Embodiment

A second embodiment is described in comparison with the first embodiment with reference to the drawings.

Difference between the second embodiment and the first embodiment exists in two points. That is, the rotating refraction unit 104 is changed to translational refraction unit 700, and the radar system in the second embodiment scans the three-dimensional manner instead of two-dimensional scan in the horizontal direction in the second embodiment. In the following description, like numerals corresponds to like parts or functions in the first embodiment.

Figure 7:
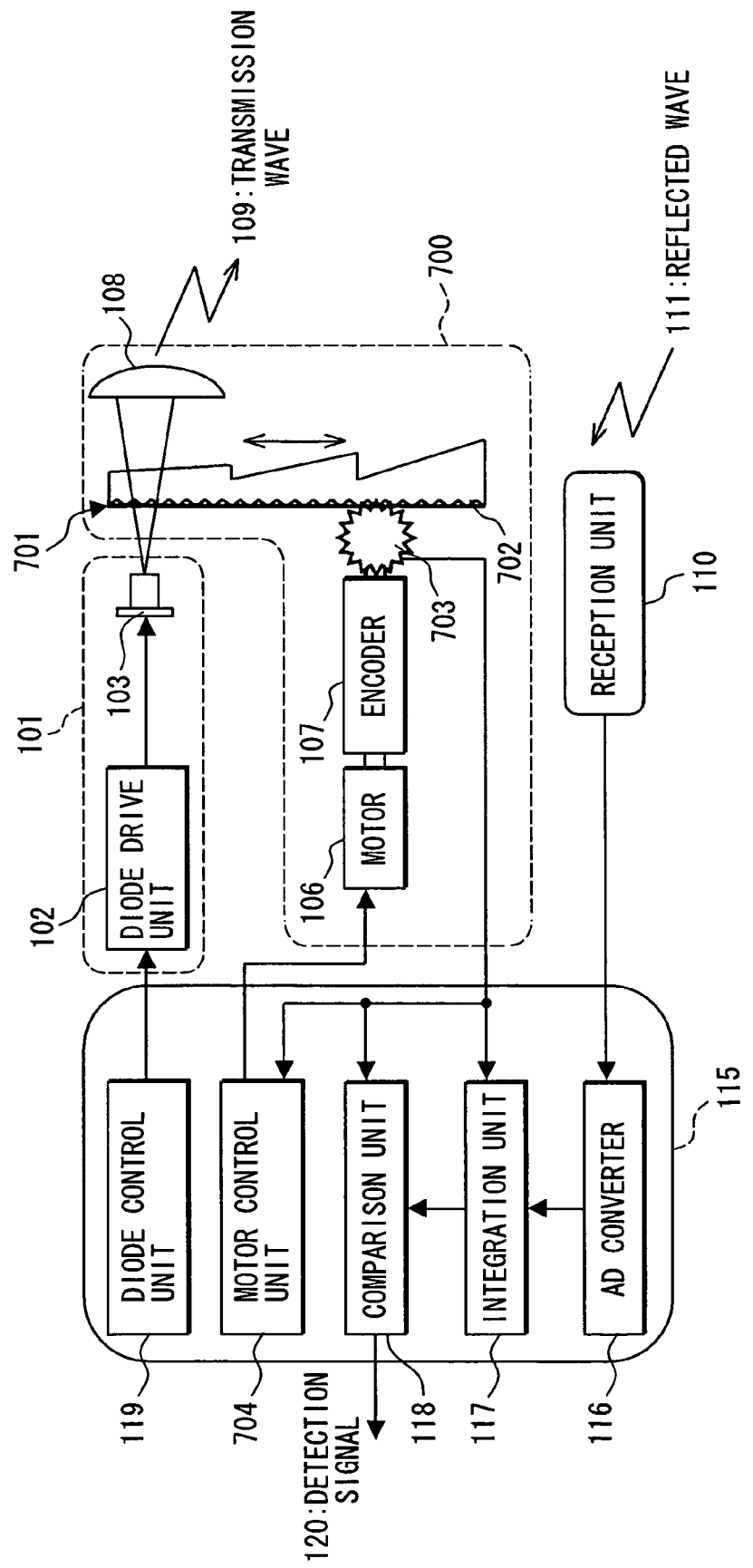
FIG. 7 shows a block diagram of the radar system in a second embodiment.

FIG. 7 shows a block diagram of the radar system in the second embodiment. The radar system includes the translational refraction unit 700, the transmission unit 101, the reception unit 110, and the calculation unit 115.

Figure 8A:
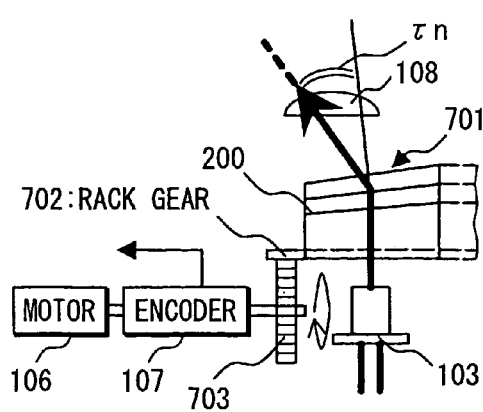
FIG. 8A shows a first illustration of a laser diode in combination with a reflector in the second embodiment.
Figure 8B:
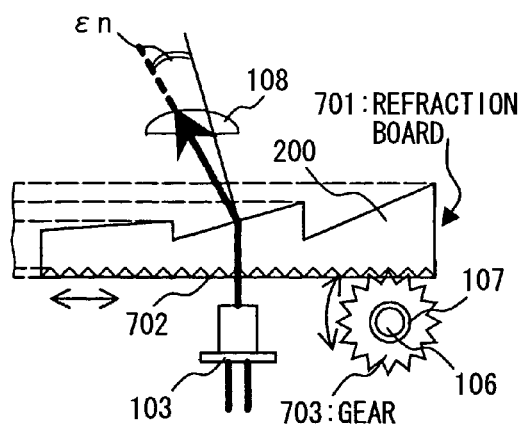
FIG. 8B shows a second illustration of a laser diode in combination with a reflector in the second embodiment.
Figures 9A, 9B:
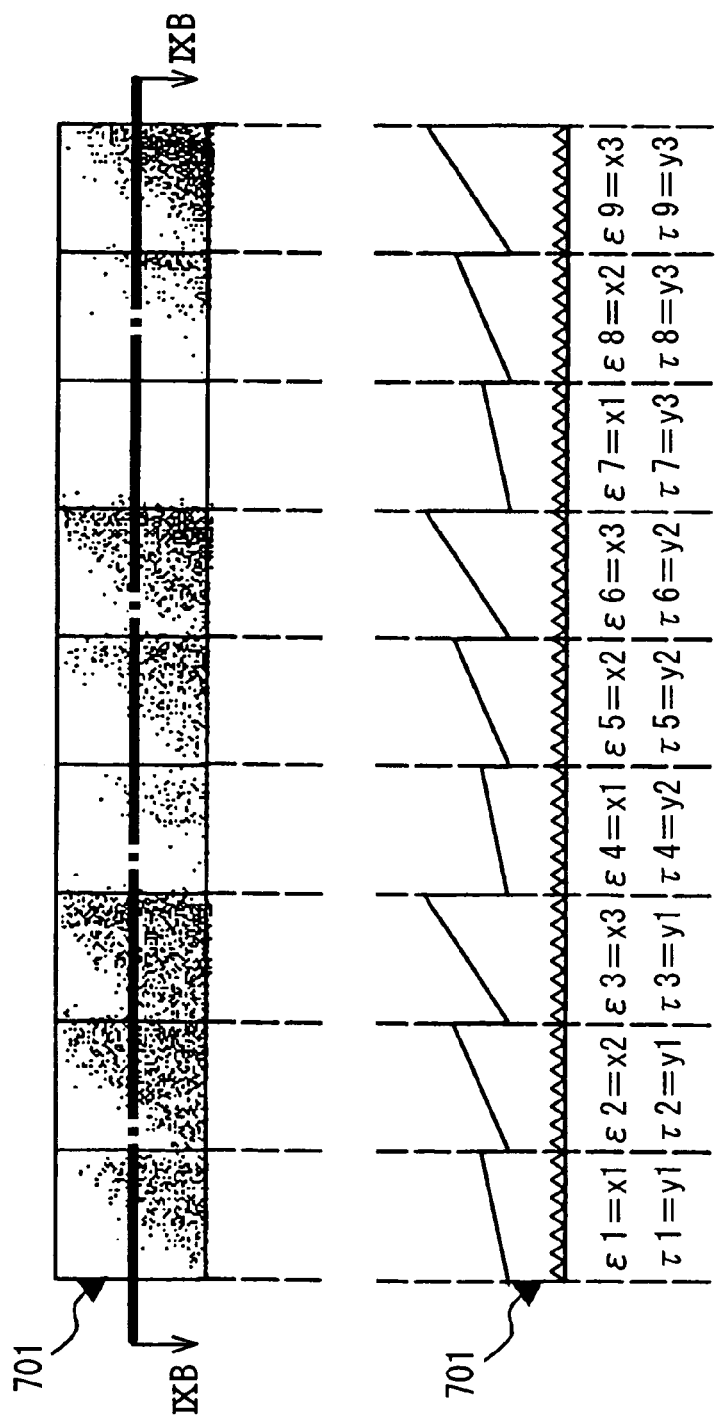
FIGS. 9A and 9B show an illustration of cross sections of prisms relative to projection angles of the laser beam.
Figure 10A:
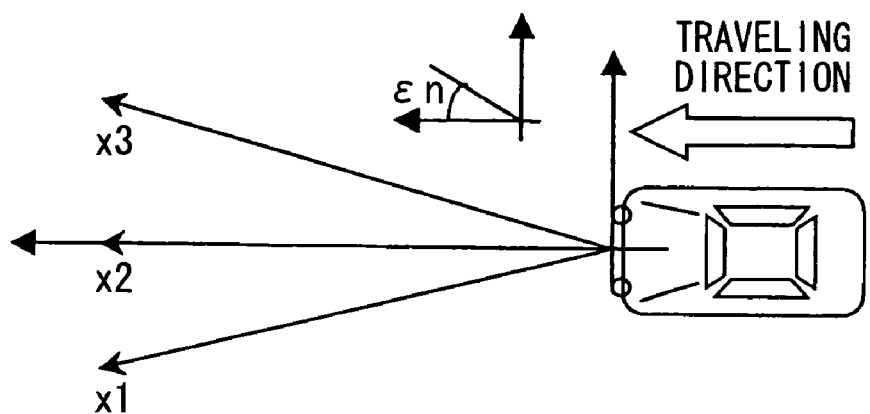
FIG. 10A shows a top view of a relationship between the horizontal projection angle relative to a vehicle in the second embodiment.
Figure 10B:
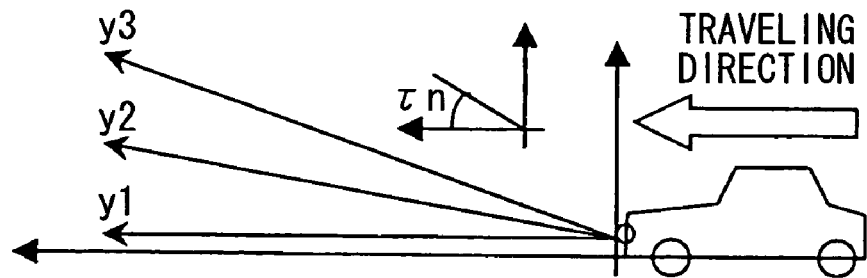
FIG. 10B shows a side view of a relationship between the vertical projection angle relative to the vehicle in the second embodiment.

Details of the translational refraction unit 700 are shown in FIGS. 8A and 8B. The translational refraction unit 700 includes a row of the prisms 200 by the number of j, each of the prism 200 projects the laser beam toward a horizontal projection angle of $\epsilon n$ and a vertical projection angle of $\tau n$ as a refraction board 701, a rack gear 702 for translational movement of the refraction board 701, a gear 703 that engages the rack gear 702, the motor 106 for driving the gear 703, and the encoder 107 for determining the rotation angle of the motor 106. The translational movement of the refraction board 701 is in a constant speed because of the constant rotation speed of the motor 106. The laser beams injected in one of the prisms 200 are projected in the same direction as are in the first embodiment. The space in front of the subject vehicle, for example, can be scanned in the three-dimensional manner when the horizontal projection angle of $\epsilon n$ and the vertical projection angle of $\tau n$ of the prisms 200 are changed in the three dimension as shown in FIG. 9B. FIG. 8A shows an illustration of the refraction board 701 seen from the projection lens 108 side, which is perpendicular to a face of an illustration in FIG. 8B. A line IXB-IXB in FIG. 9A shows a trace of the laser beam on the prisms 200, and cross sections of the prisms 200 along the line IXB-IXB are shown in FIG. 9B. In FIG. 9B, the horizontal projection angle $\epsilon n$ of the prism 200 is set to x1, x2 or x3, and the vertical projection angle $\tau n$ of the prism is set to y1, y2, or y3. FIG. 10A shows a relationship between the horizontal projection angle $\epsilon n$ relative to the subject vehicle in the second embodiment (a top view of the subject vehicle) and FIG. 10B shows a relationship between the vertical projection angle $\tau n$ relative to the subject vehicle in the second embodiment (a side view of the subject vehicle).

Operation of the radar system is described with an initial condition that the laser diode 103 is under the left most prism 200 in FIG. 9A. The laser beam is refracted by a first prism 200 having the horizontal projection angle $\epsilon 1$ of x1 and the vertical projection angle $\tau 1$ of y1. Then, a second prism 200 having the horizontal projection angle $\epsilon 2$ of x2 and the vertical projection angle $\tau 2$ of y1 comes to refract the laser beam. Then a third prism 200 having the horizontal projection angle $\epsilon 3$ of x3 and the vertical projection angle $\tau 3$ of y1 refracts the laser beam. Then, a fourth prism 200 and after have the horizontal projection angles $\epsilon 4$ of x1, $\epsilon 5$ of x2, $\epsilon 6$ of x3, and the vertical projection angles $\tau 4$ of y2, $\tau 5$ of y2, $\tau 6$ of y2. This means that the transmission wave 109 from the fourth prism 200 is projected right above the area that is scanned by the transmission wave 109 from the first prism 200. The transmission wave from the fifth and sixth prisms 200 are projected likewise above the scanned areas by the wave 109 from the second and the third prisms 200. The area scanned by wave 109 from the fifth prism 200 is horizontally adjacent to the area scanned by the wave 109 from the fourth prism 200. In this manner, a three-dimensional space can be scanned by the radar system described in the second embodiment.

The translational movement of the refraction board 701 makes it necessary to have a motor control unit 704 in the calculation unit 115. The motor control unit 704 uses the information on the rotation angle from the encoder 107 for inversing the direction of rotation of the motor 106 after the laser beam from the laser diode 103 is projected from the left/right most prisms 200 (i.e., the first and the jth prisms). The number of the prism being used to project the laser beam from the laser diode 103 can be determined by calculating the rotation angle of the motor 106 derived from the encoder 107 and gear ratio of the rack gear 702 and the gear 703.

This concludes the description that the radar system in the second embodiment of the present invention can scan a three-dimensional space, that is vertically in addition to horizontally (effect of the invention described in the first embodiment), when put in use in a vehicle.

Although the present invention has been fully described in connection with the preferred embodiment thereof with reference to the accompanying drawings, it is to be noted that various changes and modifications will become apparent to those skilled in the art.

For example, the refraction disc 105 in the first embodiment can only project horizontally diversified laser beams for a two-dimensional scan, the refraction disc 105 can be modified to have the vertically diversified laser beam for the three-dimensional scanning by adding the prisms 200 with varying vertical projection angles $\tau n$ as described in the second embodiment.

The embodiments described above include the prisms 200 whose slant angles $\theta n$ are respectively different. However, the rotating refraction unit 104, the translational refraction unit 700, and the refraction unit 105a may have a plurality of the prisms having the same slant angle $\theta n$. For example, the front space of the subject vehicle may be selectively scanned when the number of the prisms 200 having the projection angles toward the front space of the subject vehicle is increased.

The embodiments described above include the prisms 200 having the same area of bases. That is, the prisms 200 that refract the laser beam toward the front space of the subject vehicle may have increased area of bases for selectively scanning the front space in order to have an improved S/N ratio.

Further, the rotation speed of the motor 106 may be varied (e.g., decreased) for selectively scanning the front space of the subject vehicle. In this manner, the signal factor of the reflected wave 111 may further be amplified for an improvement of the S/N ratio.

Further, the transmission unit 101 may be rotated or may be translationally moved instead of rotating/moving the rotating refraction unit 104, the translational refraction unit 700, and the refraction unit 105a. For example, a laser diode may be rotationally moved relative to the refraction disc 105 in a circle that has a same axis and a smaller diameter than the refraction disc 105.

Further, the refraction unit may be a mirror or the like for refracting the laser beam. Furthermore, the transmission unit 101 may not necessarily be limited to the laser diode 103.

Further, the position of the refraction disc 105 and the refraction board 701 may not necessarily be determined by the encoder 107. For example, a potentiometer or the like may be used for determination. Furthermore, the determination of the position may be skipped. For example, the rotation of the motor 106 rotating in a constant speed may be reversed when the laser diode 103 proceeds to an edge of the refraction board 701 to turn on a touch sensor.

Such changes and modifications are to be understood as being within the scope of the present invention as defined by the appended claims.

What is claimed is:

1. A radar system for use in a vehicle, said system comprising:
   a transmission means for transmitting a transmission wave at predetermined time intervals;
   a redirection means having a plurality of redirection planes for redirecting at least two successive transmissions of the transmission wave transmitted by the transmission means in a same direction without any intervening redirection in another direction; and
   a driving means for causing the redirection means to be rotated or translated at a constant speed to switch the plurality of redirection planes that are used for redirecting the transmission wave;
   wherein the transmission wave is redirected in the same direction through one of the plurality of redirection planes for a plurality of times when the redirection means is rotated or translated at a constant speed;
   a reception means for outputting a reception signal based on reception of a reflected wave that corresponds to a transmission wave; and
   an integration means for outputting an integrated signal upon integrating a plurality of said reception signals that correspond to said transmission waves at successive time intervals redirected in the same direction thereby enhancing the signal-to-noise ratio of the integrated signal.

2. A radar system for use in a vehicle, said system comprising:
   a transmission unit for transmitting a transmission wave at predetermined time intervals;
   a redirection unit having a plurality of redirection planes arranged at a same angle against an output direction of the transmission wave;
   a drive unit for causing the redirection means to be rotated or translated at a constant speed to switch the redirection planes in the output direction of the transmission wave wherein the transmission wave is redirected a plurality of times in the same direction through one of the redirection planes when the redirection unit is rotated or translated at a constant speed thereby to produce at least two successive transmissions in a common output direction without any intervening transmission in another output direction;
   a reception unit for outputting a reception signal based on reception of a reflected wave that corresponds to a transmission wave redirected by the redirection unit; and
   an integration unit for integrating plural of the reflected waves received by the reception unit respectively for each of the redirection planes thereby enhancing the signal-to-noise ratio of the integrated signal.

3. The radar system according to claim 1,
   wherein the redirection means includes a plurality of prisms, each having one of said redirection planes, and
   each respective prism has a different refraction angle.

4. The radar system according to claim 1,
   wherein the redirection means includes a plurality of mirrors, each having one of said redirection planes, and
   each respective mirror has a different reflection angle.

5. The radar system according to claim 2,
   wherein the redirection unit includes a plurality of prisms, each having one of said redirection planes, and
   each respective prism has a different refraction angle.

6. The radar system according to claim 2,
   wherein the redirection unit includes a plurality of mirrors, each having one of said redirection planes, and
   each respective mirror has a different reflection angle.

7. The radar system according to claim 4,
   wherein the redirection means comprises a disk that is formed by a circular arrangement of the plurality of redirection planes.

8. The radar system according to claim 4,
   wherein the redirection means comprises a board that is formed by a linear arrangement of the plurality of redirection planes.

9. The radar system according to claim 6,
   wherein the redirection unit comprises a disk that is formed by a circular arrangement of the plurality of redirection planes.

10. The radar system according to claim 6,
    wherein the redirection unit comprises a board that is formed by a linear arrangement of the plurality of redirection planes.

11. The radar system according to claim 1,
    wherein the plurality of redirection planes in the redirection means have respectively different refraction indexes.

12. The radar system according to claim 2,
    wherein the plurality of redirection planes in the redirection unit have respectively different refraction indexes.

13. The radar system according to claim 1,
    wherein the plurality of redirection planes in the redirection means have respectively different sizes.

14. The radar system according to claim 2,
    wherein the plurality of redirection planes in the redirection unit have respectively different sizes.

15. A method for enhancing a S/N ratio in a vehicular radar system, said method comprising:
- successively transmitting plural radiation beams from a vehicle at a common output direction to produce at least two successive transmissions in a common output direction without any intervening transmission in another output direction, said transmitting step including passing an outgoing transmission wave via plural redirection planes that are rotated or translated at a constant speed to thereby switch between the redirection planes and cause the transmission waves to be output at respectively corresponding different output directions, at least two successive transmissions being effected at each said output direction between switching thereof;
- receiving reflections at said vehicle of said plural transmitted radiation beams at corresponding successive time intervals and converting said reflections to plural corresponding correlated signals; and
- combining said plural corresponding correlated signals associated with a common output direction into an output vehicular radar signal having an enhanced signal-to-noise ratio as compared to an individual one of said corresponding signals.

16. A method as in claim 15 wherein said successively transmitting step comprises successively passing plural radiation pulses towards each of plural redirection planes which are, in turn, successively located in the path of a source of said radiation pulses for the duration of plural radiation pulses.

17. A method as in claim 16 wherein said redirection planes are surfaces of respectively corresponding refractive prisms.

18. A method as in claim 16 wherein said redirection planes are surfaces of respectively corresponding mirrors.

19. A method as in claim 16 wherein said redirection planes are located on a rotating member.

20. A method as in claim 16 wherein said redirection planes are located on a linearly translatable member.

21. A method as in claim 16 wherein said redirection planes are respectively oriented differently from each other in at least two dimensions thereby causing scanning of said common output direction in at least two dimensions.

22. The radar system according to claim 1, wherein an area size of each of the plurality of redirection planes is larger than a spot size of the transmission wave.

* * * * *